United States Patent [19]

May

[11] Patent Number: 4,801,683

[45] Date of Patent: Jan. 31, 1989

[54] METHOD FOR THE DEACTIVATION AND NEUTRALIZATION OF POLYOLEFIN CATALYSTS

[75] Inventor: Oscar W. May, Memphis, Tenn.

[73] Assignee: Buckman Laboratories International, Inc., Memphis, Tenn.

[21] Appl. No.: 152,921

[22] Filed: Feb. 5, 1988

[51] Int. Cl.$^4$ ............................. C08F 6/02; C08K 3/38
[52] U.S. Cl. ................................. 528/485; 528/488; 528/490; 524/405; 524/584
[58] Field of Search ............... 528/488, 489, 490, 485; 524/584, 405

[56] References Cited

U.S. PATENT DOCUMENTS

| | | | |
|---|---|---|---|
| 3,435,019 | 3/1969 | Goebel et al. | 260/93.7 |
| 3,496,156 | 2/1970 | Luciani et al. | 260/93.7 |
| 4,029,877 | 6/1977 | Yoshiura et al. | 528/483 |
| 4,156,075 | 5/1979 | Holliday et al. | 528/483 |
| 4,167,619 | 9/1979 | Van Mannekes et al. | 528/483 |
| 4,234,716 | 11/1980 | Cuypers et al. | 528/483 |
| 4,314,053 | 2/1982 | Lin et al. | 528/483 |
| 4,420,609 | 12/1983 | Lin | 528/486 |
| 4,587,330 | 5/1986 | Warfel et al. | 528/490 |
| 4,591,633 | 5/1986 | Suzuki et al. | 528/485 |

FOREIGN PATENT DOCUMENTS

| | | | |
|---|---|---|---|
| 821610 | 8/1969 | Canada | 528/483 |
| 840861 | 7/1960 | United Kingdom | 528/483 |

*Primary Examiner*—Joseph L. Schofer
*Assistant Examiner*—F. M. Teskin
*Attorney, Agent, or Firm*—Finnegan, Henderson, Farabow, Garrett & Dunner

[57] ABSTRACT

A method of deactivating active, corrosive catalyst residues in an olefin polymer, and simultaneously neutralizing these corrosive residues. The polymer containing the catalyst residues is contacted with an effective amount of an alkali or alkaline earth salt of perboric acid.

11 Claims, No Drawings

METHOD FOR THE DEACTIVATION AND NEUTRALIZATION OF POLYOLEFIN CATALYSTS

FIELD OF THE INVENTION

The present invention provides a process for treating olefin polymers to neutralize and deactivate active, corrosive catalyst residues.

BACKGROUND OF THE INVENTION

For many years, the catalysts used in the polymerization of alpha-olefins have been the so-called Ziegler-Natta catalysts - for example, conventional, unsupported catalysts consisting mainly of the reaction products of a titanium compound, such as titanium trichloride, and a trialkylaluminum or an alkylaluminum halide. More recently, however, new Ziegler-Natta catalysts have been developed that are much more active than these conventional, unsupported catalysts. These new catalysts, called "high activity catalysts," comprise, for example, a titanium halide supported on other crystals such as magnesium chloride, and an alkylaluminum compound. The latter can be present as a complex with an electron donor compound. These high-activity catalysts have been described in the patent literature (e.g., in U.S. Pat. Nos. 3,830,787, 3,953,414, 4,051,313, 4,115,319, and 4,149,990).

The new high activity catalysts are especially useful in the homopolymerization of propylene, as well as in the copolymerization of a mixture of propylene and another alpha-olefin, such as ethylene. This is particularly so when the polymerization is carried out in a liquid diluent - for example, liquid propylene monomer as used in "liquid pool" polymerization. The higher efficiency catalysts have provided great increases in the amount of polymer produced per unit weight of catalyst, and in the yield of the desired isotactic polymer as compared to the unwanted atactic stereoisomer. As a result of the improvements provided by the high activity catalysts, the polymers produced contain such small amounts of residual catalyst that the conventional deashing steps can be eliminated.

Therefore, it is common practice to leave the catalyst residues in the final polymer product, which is commonly blended with other additives and pelletized for shipment to the users of the polymer. However, the residual catalyst must be neutralized and deactivated. Not only is it corrosive because of its acidic nature, but it is also still highly active and can react with other functional additives that may subsequently be blended with the polymer. In some cases, the reaction with the additives will produce highly colored compounds, thus discoloring the polymer pellets. The reactivity of the catalyst residues can also interfere with the intended effects of the additives used at this stage or in later processing.

Several different materials can be blended with the polymer to neutralize the acidity. These include certain alkaline earth salts and other alkaline inorganic compounds or minerals. However, while such additions can eliminate the corrosivity of the residues, the catalyst still remains active and can have detrimental reactions with other additives. Therefore, it is necessary to use an additional material, along with the neutralizer, to deactivate the catalyst.

Many catalyst deactivation methods have been disclosed, including the use of water, oxygen, peroxide solutions, alcohols, carbon monoxide, alkylene oxides, and the like. Examples of such methods are found in U.S. Pat. Nos. 3,435,019, 3,496,156, 4,029,877, 4,156,075, 4,167,619, 4,234,716, 4,314,053, 4,420,609, and 4,591,633. However, these all have certain disadvantages.

For example, alkylene oxides have been widely used for this purpose, but they cause undesirable off-odors in products molded from the polyolefin. The gaseous materials are generally too slow in their action and require special equipment for treating the polymer. Some of the peroxides proposed require the use of aqueous solutions, and it is not desirable to introduce significant amounts of water into these polymer systems. Some of the earlier methods in the prior art also were intended for use with the older catalyst systems and required the subsequent deashing of the polymer.

It is therefore an object of the present invention to provide a new, more efficient method of treatment of the polyolefins produced with high activity catalysts that obviates the disadvantages of the prior art. It is another object of the invention to provide a method in which both the neutralization of the catalyst residues and the chemical conversion of these residues to non-reactive substances will be accomplished by the addition of a single chemical substance, and such treatment will not require the deashing of the polymer.

Other objects and advantages of this invention will become apparent from a reading of the specification and appended claims.

DESCRIPTION OF THE INVENTION

The present invention provides a method of treating olefin polymers that rapidly and efficiently neutralizes and deactivates the residues of active, corrosive catalysts so that these residues can be left in the polymer without detriment to its subsequent uses. Examples of active, corrosive catalysts include Ziegler-Natta catalysts, such as those comprising an organometallic compound and a transition metal compound. The term "catalyst residues", as used herein, comprises the catalyst and any decomposition products thereof. The term "olefin polymer" as used herein, comprises both olefin homo- and copolymers.

The method comprises blending with the olefin polymer, preferably immediately after polymerization, a relatively small quantity of an alkali or alkaline earth salt of perboric acid. The perborate salt is added either batchwise or continuously, preferably in a concentration of about 0.01 to about 1 percent, based on the weight of polymer solids treated. The effective concentration of perborate salt to be employed may readily be determined by one skilled in the art.

Suitable perborate salts include sodium, potassium, lithium, barium, calcium, magnesium, and strontium perborates. However, the alkaline earth salts of perboric acid are the preferred salts for the purposes of this invention, and more particularly the calcium perborates. They have the advantages of lower water solubility, as well as lower toxicity and safety for use in polyolefins that might be used in food and drug packaging applications.

To disclose the nature of this invention more clearly, the following illustrative examples are given. It should be understood, however, that the invention is not to be limited to the specific conditions or details set forth in these representative examples.

EXAMPLE 1

To a 5-liter flask were charged 116.7 g of calcium hydroxide Ca(OH)$_2$], 209.4 g of calcium chloride dihydrate [CaCl$_2$.2H$_2$O], and 900 g water. This mixture was stirred, and the temperature was maintained at 20°–25° C. To this were added 571.8 g borax decahydrate [Na$_2$O.2B$_2$O$_3$.10H$_2$O] and then 680.1 g 30% hydrogen peroxide [H$_2$O$_2$]. The mixture was stirred for two hours. The solids were then filtered out, and the filter cake was reslurried with water and filtered again. Finally, the solids were dried overnight in a vacuum oven at 50° C. The product thus obtained was a calcium perborate [Ca(BO$_3$)$_2$] containing the equivalent of 27.9% calcium oxide [CaO] and 10.0% active oxygen [O].

EXAMPLE 2

The calcium perborate prepared as described in Example 1 was tested as a catalyst neutralizer and deactivator on polypropylene from a commercial operation based on the use of high-activity Ziegler-Natta catalysts. The polypropylene manufacturing process in this operation begins with a pressurized first-stage reactor in which a pool of liquefied propylene is maintained. Evaporation of propylene from the liquid pool helps to remove heat from the reactor. Catalyst is added to this reactor to maintain the polymerization process, and liquid containing the polypropylene, catalyst, and unpolymerized propylene is periodically transferred to a second reactor. In the second reactor, more propylene, ethylene, or other monomers (for copolymers) are added, and the polymerization is continued. With the older technology, this mixture would then have gone to a deashing stage. However, with the newer high-activity catalysts, the deashing stage is skipped, and the mixture goes directly to a dryer/blender where it is mixed with additives (lubricants, mold release agents, antioxidants, antistats, etc.)

In the experiments of this example, samples of polypropylene powder were taken from the first-stage reactor, sealed in airtight polyethylene bags, brought to the lab, and placed in a dry box. In the dry box, an inert atmosphere of dry nitrogen was maintained, and all handling of the polymer and additives was done without exposure to air or moisture. In each experiment, the appropriate amounts of the polymer powder and additives were mixed and then fed into a heated laboratory extruder, where the polymer powder was formed into pellets.

In every case, a calcium stearate lubricant and BHT (butylated hydroxytoluene) antioxidant were added (the "Control"). The various combinations of a hydrotalcite neutralizer, the calcium perborate described in Example 1, and/or a hindered-phenol type additive were added. The last forms a colored compound with active catalyst residues and makes the pellets yellow. A concentration of 1000 ppm by weight of hydrotalcite and/or 1000 ppm by weight of calcium perborate was used in all samples treated with one or both of these materials. Neutralization was judged by the corrosivity of the polymer pellets in contact with a steel plate, and deactivation was judged by whether or not the pellets turned yellow or stayed white.

The results of the experiments, which are summarized in Table 1, show clearly that the calcium perborate neutralized and deactivated the catalyst residues in the polymer samples. The color formation normally seen from the reaction of catalyst residues with the hindered phenol additive was completely prevented in all polymer batches treated with the calcium perborate. The polymer batches to which had been added only the calcium stearate and the BHT (the "Control") stayed white, since no phenolic additive was present, but still had a high degree of corrosivity. When the phenolic additive was added to a "Control" batch without other treatment, the pellets turned yellow. When the hydrotalcite neutralizer was used with the phenolic additive, the yellow color was somewhat less pronounced but still quite obvious in comparison to the "Control." When the calcium perborate was used with the phenolic additive, the polymer pellets came out white, just the same as the "Control." Also the whiteness of the pellets containing the phenolic additive and perborate appeared essentially the same whether the perborate was used alone or in combination with the hydrotalcite. That is, adding the hydrotalcite neutralizer gave no apparent improvement over what was obtained with the perborate by itself. Both the hydrotalcite and the calcium perborate acted as neutralizers and rendered the pellets noncorrosive, but the perborate gave the added benefit of deactivating the catalyst, as evidenced by the prevention of the color-forming reaction between the catalyst residues and the phenolic additive.

TABLE 1

| ADDITIVES | POLYPROPYLENE SAMPLES | | | | | | | | | |
|---|---|---|---|---|---|---|---|---|---|---|
| | 1 | 2 | 3 | 4 | 5 | 6 | 7 | 8 | 9 | 10 |
| Calcium stearate | X | X | X | X | X | X | X | X | X | X |
| BHT | X | X | X | X | X | X | X | X | X | X |
| Hydrotalcite | | | | X | | | | X | | X |
| Calcium perborate | | | | | | X | | | X | X |
| Hindered phenol | | X | | X | X | X | X | X | X | X |

RESULTS:

SAMPLE 1  High corrosivity, no color formation.
SAMPLE 2  High corrosivity, strong color formation.
SAMPLE 3  High corrosivity, no color formation.
SAMPLE 4  Zero corrosion, low to moderate color formation.
SAMPLE 5  High corrosivity, strong color formation.
SAMPLE 6  Zero corrosion, no color formation.
SAMPLE 7  High corrosivity, strong color formation.
SAMPLE 8  Zero corrosion, low to moderate color formation.
SAMPLE 9  Zero corrosion, no color formation.
SAMPLE 10 Zero corrosion, no color formation.

We claim:

1. A method of deactivating active, corrosive Ziegler-Natta catalyst residues in an olefin polymer, and simultaneously neutralizing these corrosive residues, comprising the step of contacting said polymer containing said residues with an amount of an alkali or alkaline earth salt of perboric acid effective to deactivate and neutralize said residues.

2. The method of claim 1, wherein said olefin polymer is either propylene homopolymer, or a copolymer of propylene containing a minor amount of a monomer selected from ethylene and other copolymerizable alpha-olefins.

3. The method of claim 1, wherein said olefin polymer containing active, corrosive catalyst residues is contacted with about 0.01 to 1.0 percent, based on the weight of said olefin polymer, of an alkali or alkaline earth salt of perboric acid.

4. The method of claim 1, wherein the salt of perboric acid is calcium perborate.

5. The method of claim 1, wherein the salt of perboric acid is sodium perborate.

6. The method of claim 1, wherein the salt of perboric acid is barium perborate.

7. The method of claim 1, wherein the salt of perboric acid is magnesium perborate.

8. The method of claim 1, wherein the salt of perboric acid is potassium perborate.

9. The method of claim 1, wherein the salt of perboric acid is lithium perborate.

10. The method of claim 1, wherein the salt of perboric acid is strontium perborate.

11. The method of claim 1, wherein said alkali or alkaline earth salt of perboric acid is contacted with a powder of said olefin polymer containing said residues.

* * * * *